Feb. 26, 1935. C. M. GERE 1,992,821
MOLD FOR PRESSING AIRTIGHT WRAPPED CHEESE
Filed Sept. 19, 1932 2 Sheets-Sheet 1
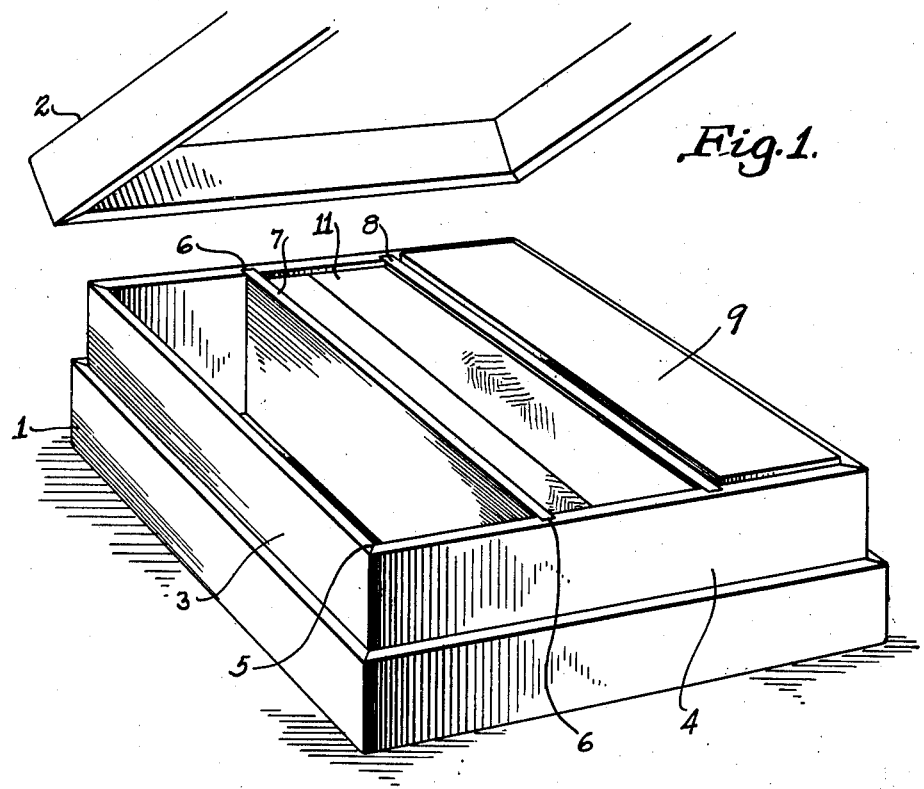
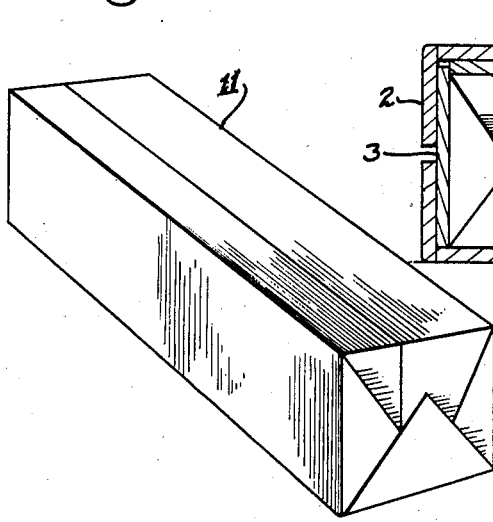
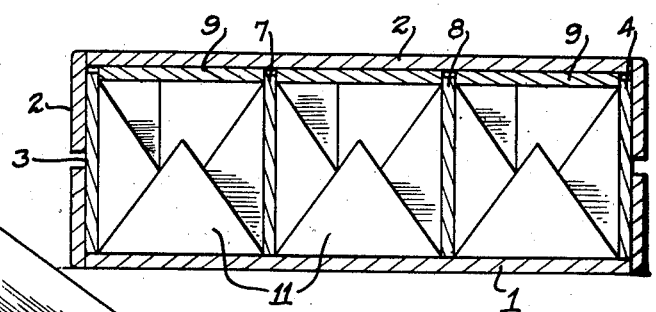
Inventor
CLAIR M. GERE Feb. 26, 1935.    C. M. GERE    1,992,821
MOLD FOR PRESSING AIRTIGHT WRAPPED CHEESE
Filed Sept. 19, 1932    2 Sheets-Sheet 2
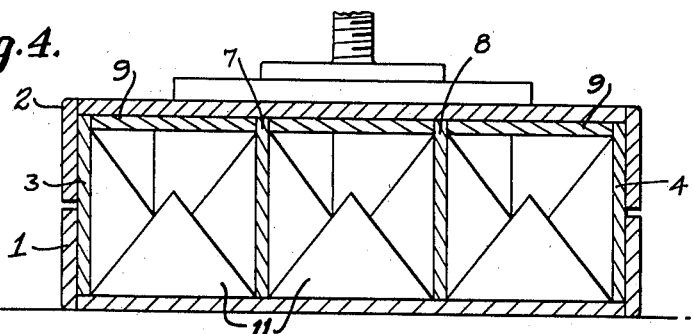
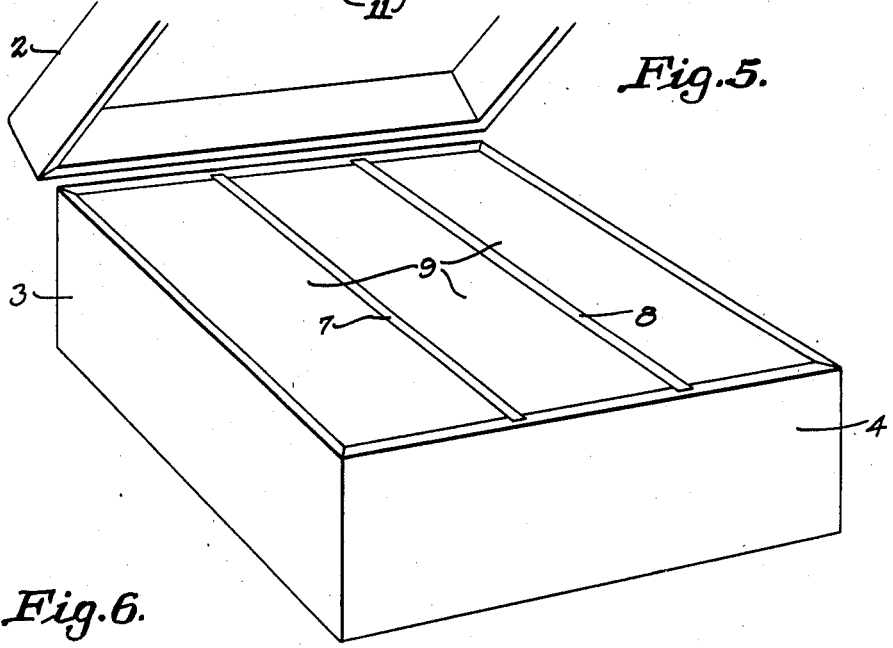
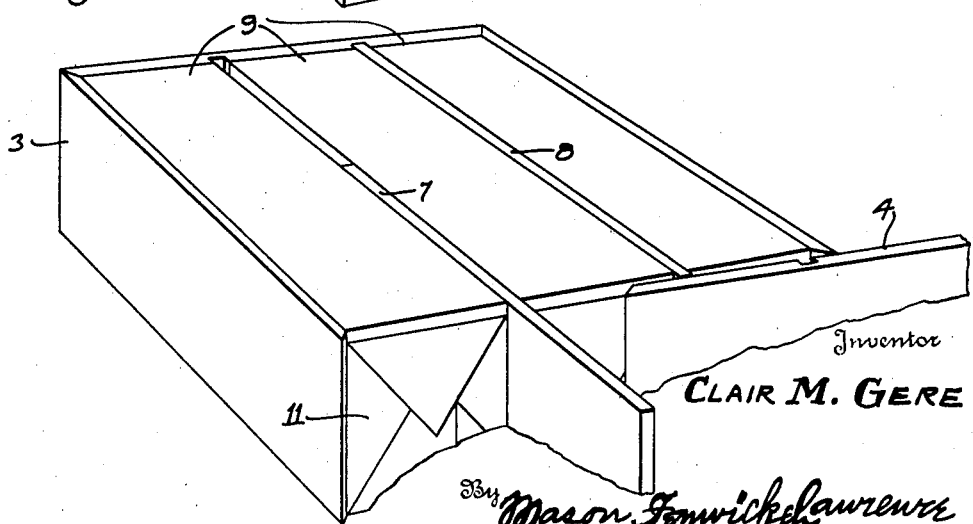
Inventor
CLAIR M. GERE Patented Feb. 26, 1935

1,992,821

UNITED STATES PATENT OFFICE 1,992,821

MOLD FOR PRESSING AIRTIGHT WRAPPED CHEESE

Clair M. Gere, Green Bay, Wis., assignor to Natural Cheese Corporation, Dover, Del., a corporation of Delaware Application September 19, 1932, Serial No. 633,873

1 Claim. (Cl. 100—55)

This invention relates to the packaging of cheese and it is a development of the idea embraced in my invention disclosed in my application for patent Serial No. 589,298, filed January 27, 1932, in which it is proposed to package uncured cheese in an air-tight close fitting wrapper so as to exclude air from the surface of the cheese and thus to inhibit the growth of mold. Incidentally, the evolution of carbon dioxide gas incident to the ripening of the cheese fills the microscopic voids and interstices that may exist between the cheese and wrapper, so diluting the small amount of residual air as to render it incapable of supporting mold culture.

The present invention contemplates an improved mold for applying the air-tight wrapper tightly to the surface of the cheese block, whether of cured or uncured cheese.

One of the objects of the invention is to provide a mold in which the wrapped cheese block is pressed so as to bring the cheese and wrapper into intimate surface contact on all sides, and in which the pressure limit is absolutely determined so as to avoid rupture of the wrapper.

Another object of the invention is to provide a mold in which different pressure limits can selectively be employed.

A further object of the invention is to provide a mold, the parts of which are so assembled that they fall apart or may be slid from the packaged cheese blocks, in the act of disassembling so as to avoid the creation of suction between the mold parts and the surfaces of the wrapper which might draw the wrapper away from the cheese, causing air to enter in the void thus created.

Still another object of the invention is the novel process of the air-tight packaging of cheese by pressing the cheese into intimate contact with the surfaces of its wrapper.

Other objects of the invention will appear as the following description of a preferred and practical embodiment thereof proceeds.

In the drawings which accompany and form a part of the following specification, and throughout the several figures of which the same characters of reference have been employed to designate identical parts:

Figure 1 is a perspective view of a three-section cheese mold, the cover being removed;

Figure 2 represents in perspective a block of cheese preliminarily packaged in an air-tight wrapping;

Figure 3 is a cross section through the cheese mold illustrating the position of the followers before pressing;

Figure 4 is a similar view showing the position of the followers after pressing; and Figure 5 is a perspective view of the cheese mold, the bottom and top having been removed and the sides ready to fall away or be slid out of contact with the wrapped cheese blocks.

Figure 6 is a perspective view showing the mold in part disassembled.

Referring now in detail to the several figures, the numerals 1 and 2 represent the top and bottom members of the mold which are in the form of trays with surrounding side and end flanges, permanently secured together. The collapsible portion of the mold comprises sides 3 and ends 4, freely fitting within the top and bottom members and preferably mitered at their corners as indicated at 5 in Figure 1. The ends 4 in a three-section mold are provided with grooves 6 for freely receiving the ends of partitions 7 and 8. The mold may be made in as many sections as may be desired; the inventive principle is the same.

The mold is provided with followers 9 in the form of slabs of wood of the same horizontal dimensions as the individual sections and freely fitting therein. In a three-section mold there, of course, will be three followers. Figures 1 and 3 show when the followers are in place on the unpressed package, a portion of the follower extends above the general level of the sections. When the cover 2 is applied as indicated in Figure 3, it rests upon the followers and the maximum pressure that can be applied to the cheese blocks is that which brings the followers down to the level of the plane of the sections as shown in Figure 4. Excess pressure is merely transmitted through the vertical members of the mold and not to the cheese block, in consequence of which, the thickness of the followers having been properly determined in the first place, there is no danger of rupturing the wrappers through excessive pressing.

It is, of course, obvious that the limit of pressure which can be applied to the cheese blocks may be selectively determined by choosing followers of different thickness. For example, the mold illustrated in the present drawings is a standard mold for five pound cheese blocks, and the cheese blocks when first placed in the mold for pressing, are shorter than the height of the mold by one-fourth inch. The followers are one-half inch thick so that when resting upon the cheese blocks, before pressing, one-fourth inch of the followers extends above the plane of the mold. If desired, followers three-fourths of an inch thick could be employed so that a thickness of one-half inch would project above the plane of the mold and would represent the amount of compression to be imparted to the cheese blocks.

In carrying out the process of packaging cheese according to the present invention, it is assumed first to have been molded into blocks bearing an exact size ratio to weight. In other words every five pound block will have exactly the same volume and, therefore, will be subjected to the same pressure in the wrapping mold. The blocks are wrapped in cellophane or any other desired airtight wrapping, an example of which is shown at 11 in Figure 2. They are then placed in the wrapping mold, the followers put into position resting upon the tops of the cheese blocks. The cover is then put on and pressure applied in a press, for a period of about twelve hours, the pressure being sufficient so that by the end of which time, all the air has been expelled from the surface of the cheese and the wrapper itself, and the wrapper is set tightly against the surfaces of the cheese. The cheese has also taken a perfect shape and when released from the mold the package is ready for the final waxing or other moisture-proofing step. In releasing the wrapped cheese blocks, the bottom and cover portions 1 and 2 are removed, and the end pieces 4 let fall away from the cheese. This they will readily do, since the slight differences in the thickness of the wrapper at the ends of the cheese blocks due to the folds, prevent the formation of vacuum pockets. The sides and partitions may then be freely slid along the surfaces of the cheese packages until they are out of place. This prevents the drawing away of the wrapper from the surface of the cheese through suction.

In this connection it has been found that wood is preferable to metal as a material for the making of the mold, since metal, being absolutely non-porous, is apt to engender vacuum pockets between the mold parts and wrapper when it is attempted to remove the mold.

While I have in the above disclosure defined the preferred and practical form of the invention, it is to be understood that the scope of the protection afforded by my patent when granted, is not to be limited to the specific structure herein illustrated and described, but to extend to such variations and modifications of the invention as may come within the terms of the appended claim.

What I claim is:

Mold for pressing an air impervious wrapper into air excluding contact with the plane surfaces of cheese blocks, said mold comprising bottom and cover trays provided with side and end flanges, mutually unsecured side, end and partition members seated in mutual contact in said bottom tray and held against expansion by the flanges of said bottom and cover trays, the depth dimension of the chambers defined by said side, end, and partition members being slightly greater than the corresponding dimension of the wrapped cheese blocks which they are designed to enclose, and followers of uniform thickness snugly telescoping into said chambers adapted to rest upon the cheese blocks and of such thickness as to cause them normally to extend above the plane of the tops of said chambers, the volumes of the extending portions of said followers determining the displacement of the cheese blocks under compression, the limit of compression being determined by the abutment of the cover tray against the upper edges of said top, end and partition members, when said followers have been pressed to a position in which their top surfaces lie in said plane, all mold members which contact the cheese blocks excepting the bottom being slidable relative to the surfaces which they contact.

CLAIR M. GERE.